United States Patent [19]

Tamamura

[11] Patent Number: 4,634,253

[45] Date of Patent: Jan. 6, 1987

[54] UNDERWATER PHOTOGRAPHABLE CAMERA

[75] Inventor: Hideo Tamamura, Tokyo, Japan

[73] Assignee: Canon Kabushiki Kaisha, Tokyo, Japan

[21] Appl. No.: 571,449

[22] Filed: Jan. 17, 1984

[30] Foreign Application Priority Data

| Jan. 19, 1983 | [JP] | Japan | 58-7106 |
| Jan. 19, 1983 | [JP] | Japan | 58-7107 |
| Jan. 19, 1983 | [JP] | Japan | 58-7108 |

[51] Int. Cl.$^4$ ............................ G03B 3/10; G03B 17/08
[52] U.S. Cl. ................................ 354/403; 354/400; 354/64
[58] Field of Search .................. 354/400, 402, 403, 64

[56] References Cited

U.S. PATENT DOCUMENTS

| 4,381,144 | 4/1983 | Breslau ................................. 354/64 |
| 4,470,680 | 9/1984 | Inagaki ............................. 354/64 X |

FOREIGN PATENT DOCUMENTS

57-46235  3/1982  Japan .................................... 354/64

*Primary Examiner*—Michael L. Gellner
*Attorney, Agent, or Firm*—Toren, McGeady, Stanger, Goldberg & Kiel

[57] ABSTRACT

A camera of waterproof construction permitting underwater photography includes focusing means for adjustment of the focal point of a photo-taking lens and operation means for adjusting the focal point of the lens to a predetermined position suited for underwater photography.

8 Claims, 13 Drawing Figures

UNDERWATER PHOTOGRAPHABLE CAMERA

BACKGROUND OF THE INVENTION

1. Field of the Invention

This invention relates to a waterproof camera with focusing means or an automatic focusing mechanism incorporated therein and more particularly to a camera designed to facilitate lens focusing at a given distance for underwater photography.

2. Description of the Prior Art

A known automatic focusing mechanism which operates on the basis of detected brightness or contrast of an object to be photographed cannot perform distance measurement unless the object brightness is above a certain level. Underwater, where the object is to be photographed, not only has low contrast but also has a low degree of brightness. Distance measurement is difficult for an automatic focusing mechanism of this type. When using an automatic focusing mechanism of another known type performing the distance measurement on the basis of infrared rays reflected from the photographing object, underwater distance measurement cannot be satisfactorily performed because the infrared rays are absorbed by water. It has, thus, been impossible to use an automatic focusing mechanism for underwater photography. Therefore, the conventionally practiced methods for underwater photography have included a manual distance measuring method in which photography is performed by adjusting the focal point of a lens depending on the result of distance measurement performed with the eye; and a fixed focus method in which the focal point of the lens is fixed at a position corresponding to a distance of about three meters and the aperture of the lens is stopped down to obtain a sufficient field depth to obtain a photography range from the nearest distance to an infinite distance. However, the manual distance measuring method necessitates a troublesome focusing operation, although accurate focusing can be performed. Under water, the photographer must repeatedly come up to the surface to breathe. It is not easy for the photographer to estimate the distance and focus the lens. Therefore, it has been difficult to carry out reliable underwater photography using the manual distance measuring method. When using the fixed focus method, on the other hand, although there is not such troublesome operation to focus the lens every time, it is impossible to sharply photograph objects over the total range from the nearest distance to infinite distance, since there is some blurring for objects located near or far. Particularly in underwater photography, the objects to be photographed (fishes, coral) and often located at a distance of only one meter or so. Close-up photography is thus frequently required. When using conventional fixed focus cameras, the nearest photographable distance is generally 1.5 m or thereabouts. It has been almost impossible to take sharp photographs of objects located at closer distances, such as one meter.

It is an object of the present invention to provide a waterproof camera permitting underwater photography, wherein there are provided focusing means for adjusting the focal point of a photo-taking lens and operation means for adjusting the focal point of the lens to a position suited for underwater photography. For ordinary photography (land photography), the above focusing means permits accurately focused photography; and, for underwater photography, the above operation means adjusts the photo-taking lens to a focus position suited for underwater photography, so that the operability and performance of the camera can be enhanced for underwater photography.

It is a second object of the invention to provide a camera of the above kind, wherein the focusing means is composed of an automatic focusing mechanism improving operability and performance in ordinary photography.

It is a third object of the invention to provide a camera of the above kind, wherein the operation means automatically operates in response to an underwater photographic operation.

These and further objects of the invention will become apparent from the following detailed description of preferred embodiments thereof taken in conjunction with the accompanying drawings.

SUMMARY OF THE INVENTION

An underwater photography camera of waterproof construction comprising focusing means for adjusting a focus position of a photo-taking lens and operation means for restricting the focusing means to bring the focus position of the photo-taking lens into a position suited for underwater photography.

DETAILED DESCRIPTION OF THE PREFERRED EMBODIMENTS

Figure 1:
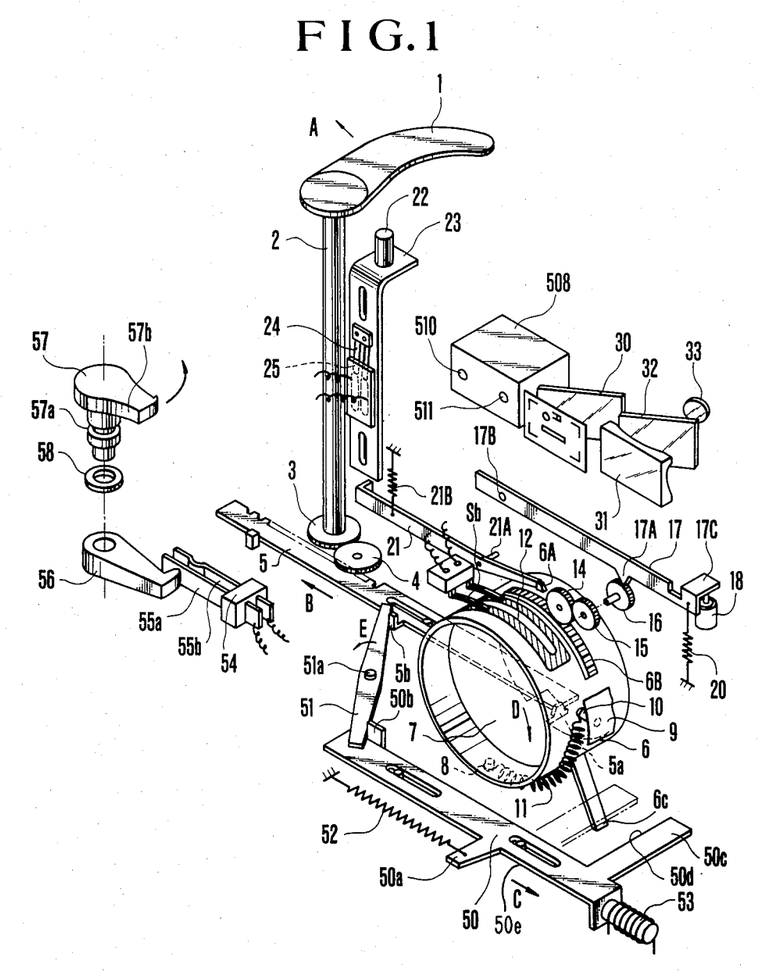
FIG. 1 is an illustration of the structural arrangement showing the essential parts of a camera in a first embodiment of the invention.
Figure 2:
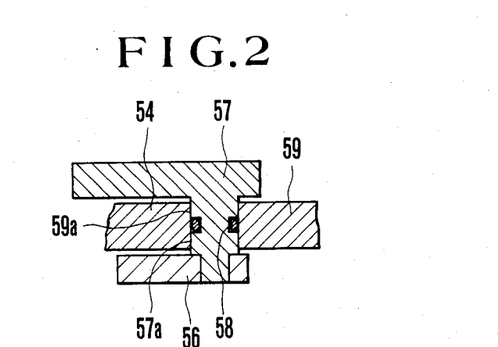
FIG. 2 is a sectional view showing a support part for an operation lever of the camera shown in FIG. 1.
Figure 3:
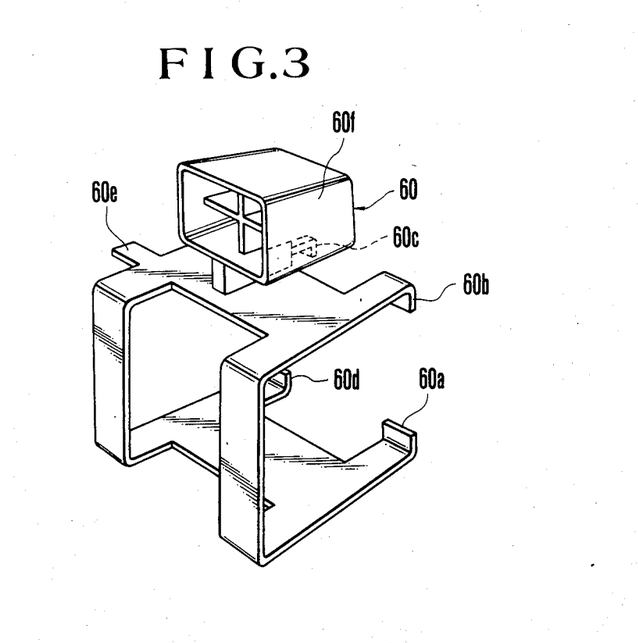
FIG. 3 is an oblique view of a frame view-finder of the camera in FIG. 1.

The details of the present invention will be understood from the following description of the preferred embodiments with reference to the accompanying drawings. FIG. 1 shows the essential parts of an underwater camera in a first embodiment of the invention. Referring to FIG. 1, the embodiment includes a wind-up lever 1 for winding up the film, a shutter, and also for charging a photo-taking lens of driving spring. A wind-up shaft 2 is responsive to the wind-up lever 1 and has a gear 3 secured to the lower end thereof. An intermediate gear 4 engages a rack part of a lens charge lever 5 and is driven by the gear 3. A lens holder 6 has a helicoid gear (not shown) on its inner surface and engages a helicoid gear (not shown), which carries the photo-taking lens 7. The lens holder 6 moves the photo-taking lens 7 back and forth in the direction of an optical axis as the helicoid gear rotates. Since a known helicoid mechanism is used for photo-taking lens 7, a description of the helicoid mechanism is omitted here. A pin 8 protrudes from the outer wall of the lens holder 6. A pin 10 is provided on the inner surface of a lens barrel frame 9 of the camera, which encompasses the lens holder 6. Between these pins 8 and 10 is a lens charge spring 11, which is charged when the lens holder 6 turns clockwise (in the direction of arrow D) engaging the projection 5a of the lens charge lever 5. On the outer circumferential surface of the lens holder 6 are provided a claw part 6A which causes the lens holder 6 to engage a clamping lever 21 in a winding charge position; a toothed part 6B; and a U-shaped membranous resistor 12 which is secured to the surface of the lens holder 6 and is parallel to the toothed part 6B. An arm 6C extends from the outside of the lens holder 6. An interlocking gear 14 engages the toothed part 6B of the lens holder 6. An intermediate gear 15 engages the interlocking gear 14. A ratchet gear 16 is secured to the same shaft as that of the intermediate gear 15. These gears 14, 15, 16 form a gear train. When the pulling force of the spring 11 causes the lens holder 6 to turn counterclockwise (opposite the direction of the arrow D), the above gear train 14, 15, 16 not only responds to the turn but also enhances the turning speed. A stop lever 17 has a claw part 17A formed in the lower middle part thereof and locks the ratchet gear 16 with the claw part 17A. The stop lever 17 is pivotally and swingably carried by a shift 17B. A bent part 17C is formed at one end of the stop lever 17 and abuts the armature of a magnet 18. The other end of the stop lever 17 engages a shutter clamping lever (not shown). A tension spring 20 is attached to the bent part 17C of the stop lever 17. The tensile force of the tension spring 20 causes the claw part 17A of the stop lever 17 to engage the ratchet gear 16. When the wind-up lever 1 performs a winding action, the lens holder 6 turns clockwise (in the direction of arrow D) charging the lens charge spring 11 and, during that time, the ratchet gear 16 turns clockwise. Then, the ratchet gear 16 slides over the stop lever 17 while it is turning clockwise. Therefore, the charging action of the lens charge spring 11 is never restricted by the claw part 17A of the stop lever 17. The clamping lever 21 is provided with a turning pin 21A and is pivotally and swingably carried by the pin 21A in the middle part thereof. A spring 21B is attached to one end part of the clamping lever 21 and causes the other end of the clamping lever 21 to engage the claw part 6A of the lens holder 6 upon completion of winding. A shutter release button 22 is attached to a release plate 23. A sliding switch piece 24 is secured to the release plate 23 through an insulating plate. A conductive contact piece 25 is secured to the fixed frame of the camera. The sliding switch piece 24 contacts the conductive contact piece 25 when the release plate 23 descends on step when the shutter release button 22 is depressed. When the switch piece 24 contacts the conductive contact piece 25, a power switch turns on. A stop lever 50 for the lens holder 6 is provided with projections 50a, 50b and 50c. A spring 52 is attached to the projection 50a and constantly urges the stop lever 50 to move in a direction opposite that of arrow C. A lever 51 is pivotally carried by a supporting shaft 51a. One end of the lever 51 abuts the projection 5b of the charge lever 5. When the charge lever 5 performs a charging action moving in the direction of arrow B, the lever 51 turns counterclockwise (in the direction of arrow E). Then, the lever 51 pushes the projection 50b of the stop lever 50 against the force of the spring 52 to charge the stop lever 50 in the direction of arrow C. Under a completely charged condition, the lever 50 is in tight contact with a magnet 53 and is continually attracted by the magnet 53. Referring to both FIGS. 1 and 2, an insulator 54 is secured to a cover 59 of the camera body. The terminals 55a and 55b are rigidly carried by the insulator 54 so that they do not come in contact with each other. A switching lever 56 is secured to the fore end of an operation lever 57. This operation lever 57 pierces a hole 59a provided in the cover 59 of the camera body and is carried through a waterproof packing 58. In FIG. 1, reference numerals 30–33 identify a viewfinder optical system. The optical system includes an objective lens 31, a half-mirror 32 and an eyepiece 33. There are provided an automatic focusing circuit 508 and an optical system (510 and 511) for receiving object image bearing light. The sequential arrangement for the automatic focusing circuit and an in-focus signal is identical with the arrangement disclosed in Japanese Laid-Open Patent Application No. SHO 54-74424. Since such arrangement does not pertain to the subject matter of the present application, the details of the description are omitted. Referring to FIG. 3, the camera is provided with a frame view-finder 60 which is usable even when the photographer is wearing a water glass or when his body is in an unstable condition. The frame view-finder 60 is provided with claw parts 60a, 60b, 60c and 60d and an operation part 60e and grasps the outside of the cover 59 of the camera body. Furthermore, a view-finder body 60f is mounted on the frame view-finder 60. The arrangement of the embodiment is described above.

The operation of the embodiment is as follows: For ordinary land photography, the wind-up or winding lever 1 is turned in the direction of arrow A to move the charge lever 5 in the direction of arrow B. With the charge lever 5 moved in the direction of arrow B, the projection 5a of the charge lever 5 causes the lens holder 6 to turn in the direction of arrow D against the force of the lens charge spring 11. Then, by virtue of locking engagement of the fore end of the clamping lever 21 and the claw part 6A, the lens holder 6 sets the focal point of the photo-taking lens 7 in the closest distance position. At the same time, the movement of the charge lever 5 causes the lever 51 to move the stop lever 50 in the direction of arrow C. The stop lever 50 then stops with its fore end attracted by the magnet 53. When the shutter release button 22 is depressed under this condition, the release plate 23 comes down. The first stroke on the shutter release button 22 closes the switch formed by the contact pieces 24 and 25, actuating the automatic focusing mechanism. A distance measurement signal, which represents the measured distance to an object to be photographed, is produced. The magnet 18 is excited by this distance measurement signal and pushes one end of the stop lever 17 upward. The claw part 17A of the stop lever 17 then disengages the ratchet gear 16. When the shutter release button 22 is depressed a second stroke, the lower end of the release plate 23 pushes the clamping lever 21 downward against the force of the spring 21B. The clamping lever 21 disengages the claw part 6A of the lens holder 6. This allows the lens holder 6 to be turned in a direction opposite that of arrow D by the charging force of the lens charge spring 11. The turning force of the lens holder 6 is enhanced by the gears 14 and 15. The gears 14 and 15 serve as a governor, turning the lens holder 6 at a constant speed. At the same time, sliding pieces Sb slide over the resistor 12. When the voltage dividing level of the resistor 12 coincides with the output level of the automatic focusing circuit 508, the magnet 18 is no longer excited and allows the stop lever 17 to be pulled down by the force of the tension spring 20. Then, the lens holder 6 stops turning and the claw part 17A of the stop lever 17 engages the ratchet gear 16. Since the lever 17 brings the overdriving stage formed by the gears 14 and 15 to a stop, the lens holder 6 stops turning with a small stopping force. The lens 7 is shifted forward or backward by this turning force of the lens holder 6, sitting the focal point according to the output of the automatic focusing mechanism. Then, a shutter (not shown) operates, completing the exposure.

Figure 4:
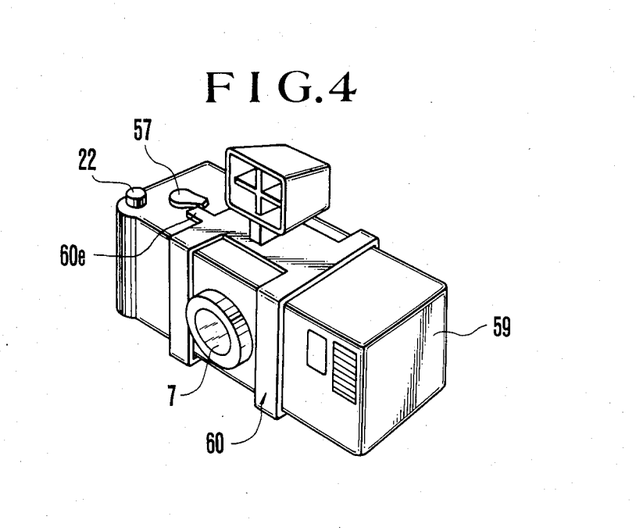
FIG. 4 is an oblique view showing the camera of FIG. 1 having the frame view-finder in FIG. 3 mounted thereon.
Figure 5:
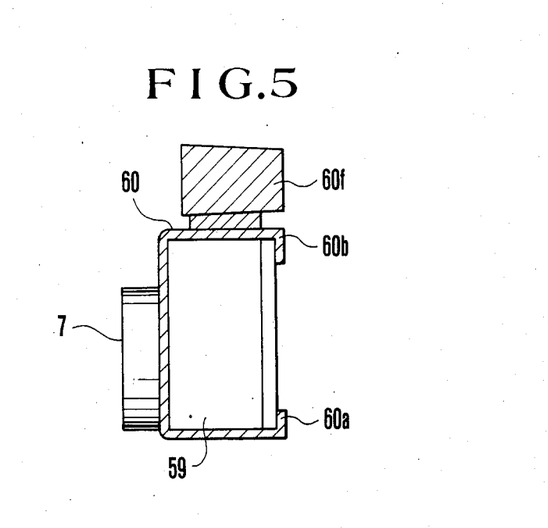
FIG. 5 is a sectional view showing the engagement of the frame view-finder in FIG. 3 with the camera of FIG. 1.

While the operation of the embodiment in the ordinary photography mode using the automatic focusing mechanism is as described in the foregoing, the photography operation thereof in the underwater photography mode is as follows: For underwater photography, the frame view-finder 60, which is shown in FIG. 3, is fitted on the cover 59 of the camera body, as shown in FIG. 4. With the frame view-finder 60 thus fitted, the operation lever 57 can be depressed by the operation part 60e of the frame view-finder 60. When the operation lever 57 is thus operated, the switching lever 56 closes the circuit of the terminals 66a and 55b. This forces the magnet 53 into a non-excited condition. Then, the lever 50, which has been attracted by the turning force of the winding lever 1 of the magnet 53, is released from the attraction. The spring 52 then moves the lever 50 in a direction opposite that of arrow C. The lever 50 stops with the projection 50c abutting the sliding pin 50e at a position indicated by a chain line. When the shutter release button 22 is depressed under this condition, the lens holder 6 begins to turn in the same manner as mentioned in the foregoing. The lens holder 6 turns until the arm 6C of the lens holder 6 abuts the projection 50c indicated by the chain line and then turns no further. Therefore, the turning position of the lens holder 6 is limited by the projection 50c. In other words, this turn limited position of the lens holder 6 is at a focus setting distance 1.0 to 1.5 m covering a range of distances most frequently used for underwater photography, such as distances from 0.7 to 4 m. Therefore, in this embodiment, the focal point of the photo-taking lens is set at a position suited for underwater photography by mounting the frame view-finder 60 on the camera. When photography is to be carried out by dividing into water while swimming at a beach or a swimming pool, for example, the focal point of the photo-taking lens can be simultaneously set at the closest distance position with mounting of the frame view-finder 60 on the camera. Furthermore, photography with the automatic focusing mechanism can be accomplished by just removing the frame view-finder 60. Therefore, camera focusing operability for underwater photography is improved by the embodiment. The embodiment thus permits sharply focused underwater photography. Furthermore, since the photo-taking can be focused for the closest distance by operating the operation lever without mounting the frame view-finder 60, focus setting for underwater photography can be readily and accurately accomplished.

Figure 6:
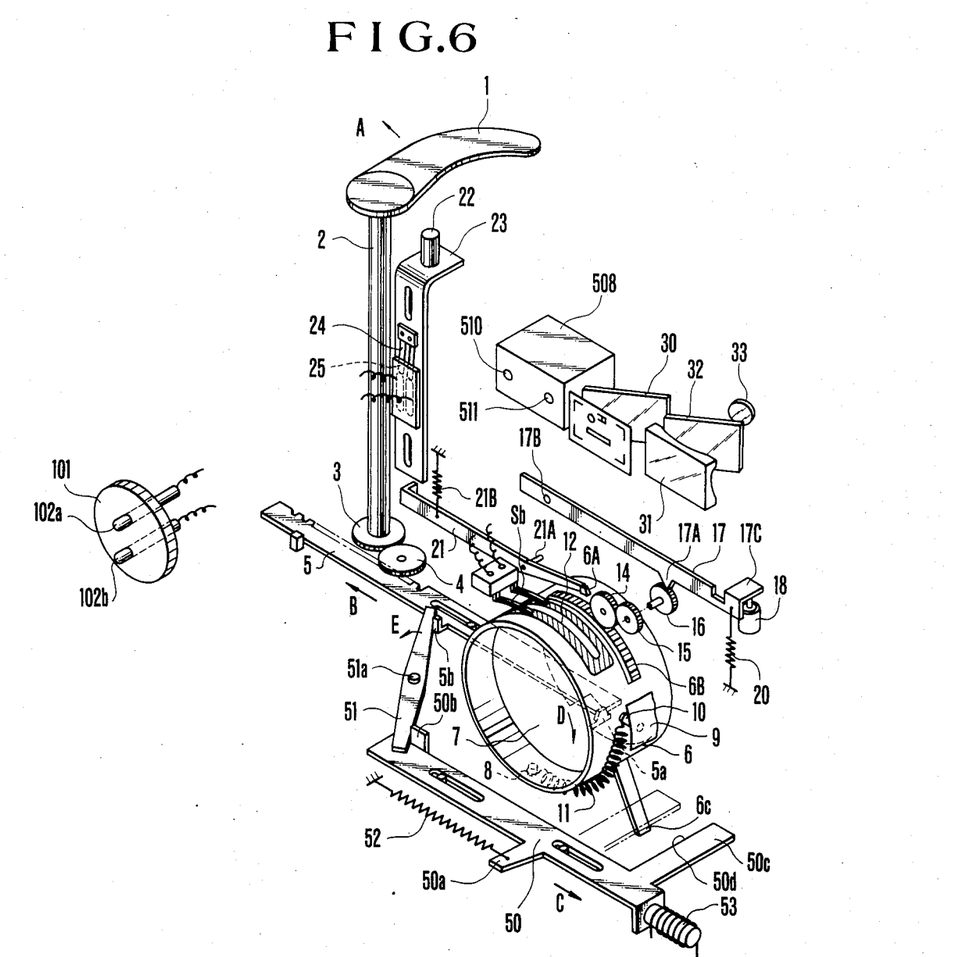
FIG. 6 is an illustration of the structural arrangement showing the essential parts of a camera in a second embodiment of the invention.
Figure 7:
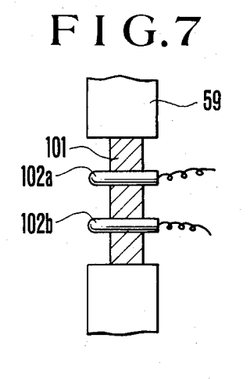
FIG. 7 is an enlarged sectional view of an underwater switch of the camera in FIG. 6.
Figure 8:
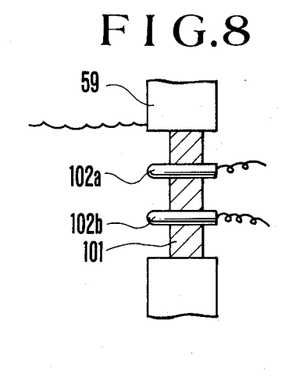
FIG. 8 is an illustration showing the switch in FIG. 7 submerged.
Figure 9:
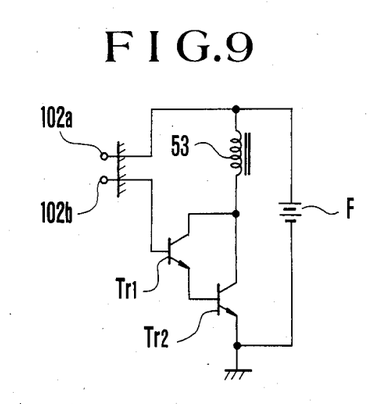
FIG. 9 is a circuit diagram showing the electric circuit of the switch in FIG. 7.
Figure 12:
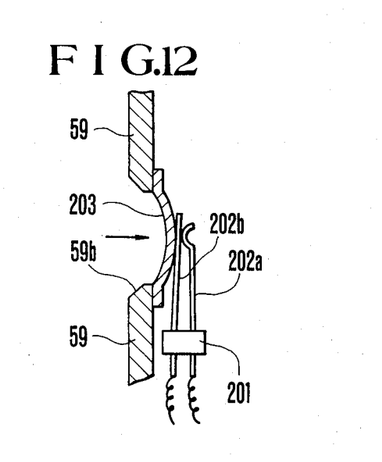
FIG. 12 is a sectional view showing the switch in FIG. 11 operating.

FIGS. 6–9 show the second embodiment of the present invention. The second embodiment is arranged in the same manner as the first embodiment shown in FIG. 1 except the switch-over means for restricting the focal point of the photo-taking lens 7 to a predetermined position for underwater photography is arranged somewhat differently from the first embodiment. Therefore, the following description is limited to the differences, while all the other parts that are arranged in the same manner as in FIG. 1 are indicated by the same reference numerals. Referring to FIGS. 6 and 7, an insulator 101 is secured to the cover 59 of the camera body. Two conductive terminals 102a and 102b, having exposed ends, pierce the insulator 101 and are carried thereby in a spaced condition. The two conductive terminals 102a and 102b are connected via an amplification circuit consisting of transistors Tr1 and Tr2 and a power source F to a coil wound around a permanent magnet 53, as shown in FIG. 9. The arrangement is such that the two terminals 102a and 102b are short-circuited under the water. Then, power is supplied to the coil of the magnet 53 putting it in a non-excited condition. With the camera immersed in the water at the time of underwater photography, the terminals 102a and 102b become conductive (see FIG. 12) forcedly bringing the permanent magnet 53 into a non-excited condition. Accordingly, the lever 50, which has been caused by the turning force of the winding lever 1 to be attracted by the magnet 53, is released from the attraction. The spring 52 then moves the lever 50 in the direction opposite that of arrow C until the lever 50 stops in a position where the projection 50c of the lever 50 is indicated by a chain line. Then, when the shutter release button 22 is depressed under that condition, the lens holder 6 begins to turn in the same manner as mentioned in the foregoing. The lens holder 6 turns until the arm 6C thereof abuts the projection 50c shown by the chain line. The lens holder 6 then turns no further. Therefore, the turnable extent of the lens holder 6 is restricted to the above-stated position of the projection 50c. In other words, the turn limiting position for the lens holder 6 is set at a focus setting distance of 1.0 to 1.5 m, which covers a distance range most frequently used for underwater photography, such as distance ranges from 0.7 to 4 m. As mentioned above, in this particular embodiment, the permanent magnet 53 is brought into a non-excited condition by immersing the camera in the water. The lever 50 is then returned to a predetermined position where the focal point of the photo-taking lens 7 is set in a position suited for underwater photography. Therefore, when photography is to be carried out by diving under water while swimming at a beach or a swimming pool, for example, the focal point of the photo-taking lens 7 can be automatically set for the nearest distance by the conductive action of the terminals 102a and 102b when the camera is immersed in the water. Then, the camera is automatically switched over to another mode in which the automatic focusing mechanism becomes operative when the camera is brought out of the water. With the camera adjusting the focal point to the nearest distance position for underwater photography and with the automatic focusing mechanism becoming operative for air photography, photography can be accomplished in a satisfactorily focused condition both in water and in air.

FIGS. 10-13 show the third embodiment of the invention. The third embodiment is arranged in the same manner as the first embodiment shown in FIG. 1, except that the switch-over means for restricting the focal point of the photo-taking lens 7 to a predetermined position for underwater photography is arranged somewhat differently from the first embodiment. Therefore, the following description is limited to the difference of the third embodiment, while all other parts which are arranged in the same manner as in FIG. 1 are indicated by the same reference numerals.

Figure 10:
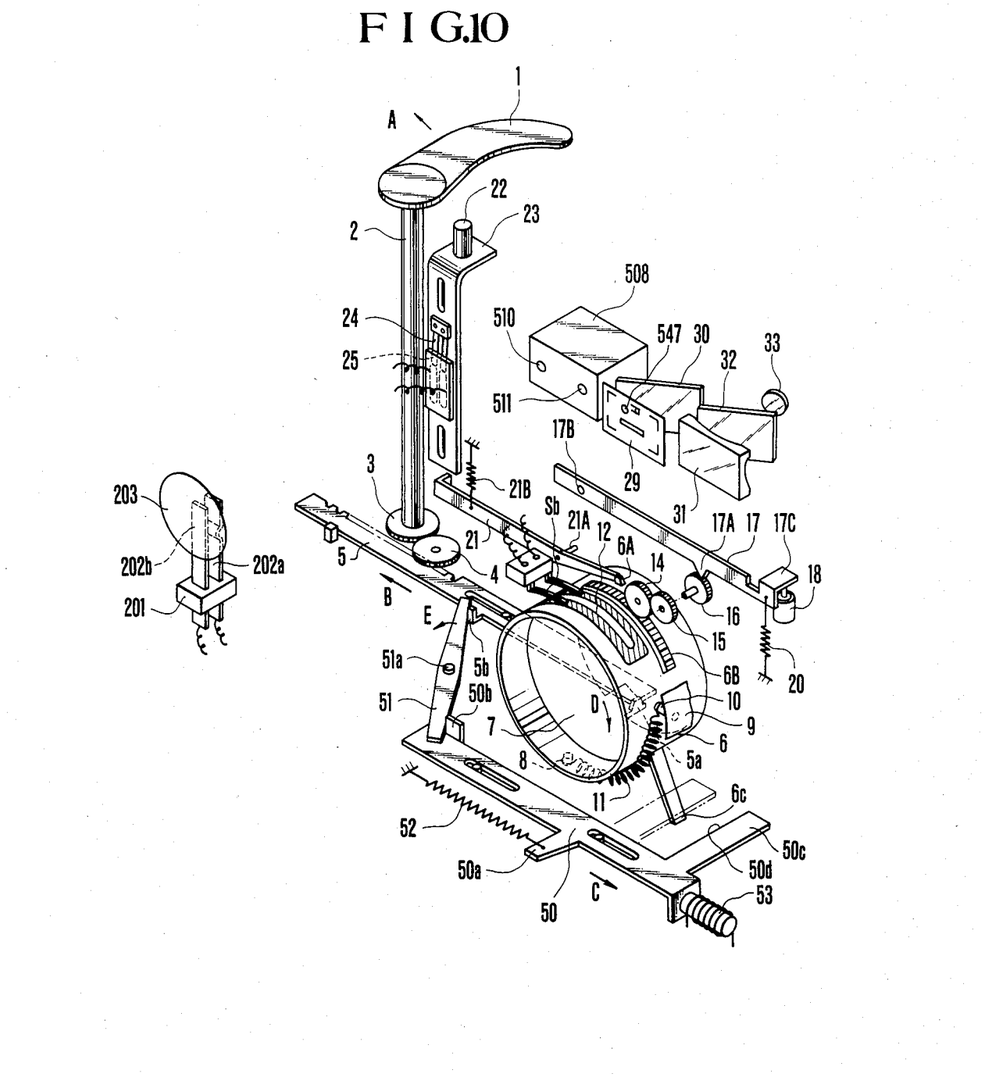
FIG. 10 is an illustration of the structural arrangement showing the essential parts of a camera in a third embodiment of the invention.
Figure 11:
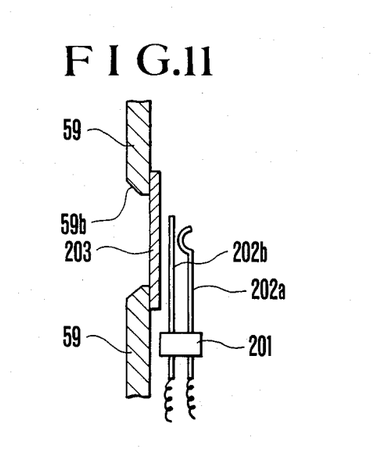
FIG. 11 is an enlarged sectional view showing a pressure switch of the camera in FIG. 10.
Figure 13:
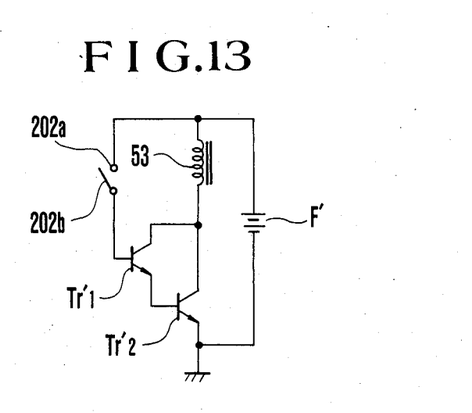
FIG. 13 is a circuit diagram showing the electrical circuit of the switch in FIG. 11.

Referring to FIGS. 10 and 11, an insulator 201 is secured to the inside of the cover 59 of the camera body. This insulator 201 carries a stationary contact piece 202a and a movable contact piece 202b which are paired and in a spaced condition. The cover 59 is provided with a through hole 59b. The through hole 59b is covered with a flexible membrane 203. The membrane 203 is made of, for example, a rubber plate and is secured to the periphery of the through hole 59b. The movable contact piece 202b is disposed close to the back side of the flexible membrane 203. The circuit of these contact pieces 202a and 202b is closed when the flexible membrane 203 is deformed to push the movable contact piece 202b. The pair of contact pieces 202a and 202b are connected via an amplification circuit consisting of transistors Tr1' and Tr2' and a power source F' to a coil wound around the permanent magnet 53, as shown in FIG. 13. Power is supplied to the coil wound around the magnet 53 when the circuit of the contact pieces 202a and 202b is closed. The magnet 53 becomes non-excited with power supplied to the coil. The arrangement iw such that, when the camera is immersed in water, the flexible membrane 203 is operated by water pressure bringing the movable contact piece 202b into contact with the stationary contact piece 202a. This forcedly brings the permanent magnet 53 into a non-excited condition. As a result, the lever 50, which has been caused by the turning force of the winding lever 1 to be attracted by the magnet 53, is released from the attraction of the magnet 53. Then, the spring 52 moves the stop lever 50 in a direction opposite the direction of arrow C until the stop lever 50 stops at the position where the projection 50c of the stop lever 50 is shown by a chain line in the drawing. When the shutter release button 22 is depressed under that condition, the lens holder 6 begins to turn in the same manner as mentioned in the foregoing. The lens holder 6 turns until the arm 6C thereof abuts the projection 50c, which is in the position shown by the chain line. Then the lens holder 6 turns no further. The turnable extent of the lens holder 6 is thus restricted to the above position of the projection 50c. In other words, the turn limiting position for the lens holder 6 is set at a focus setting distance which covers a range most frequently used for underwater photography, such as distances ranging from 0.7 to 4 m. In this specific embodiment, as mentioned above, the magnet 53 is brought into a non-excited condition by immersing the camera in the water. The stop lever 50 is then retracted to a predetermined position where the focal point of the photo-taking lens 7 is set in a position suited for underwater photography. Therefore, when photography is to be carried out by diving underwater while swimming at a beach or a swimming pool, for example, the focal point of the photo-taking lens 7 is automatically set for the nearest distance when the contact pieces 202a and 202b become conductive in response to the immersion of the camera in the water. Then, when the camera is brought out of the water, it is automatically switched to another mode in which the automatic focusing mechanism becomes operative. With the camera thus adjusting the focal point of the photo-taking lens 7 to the closest distance position for underwater photography and then having the automatic focusing mechanism become operative for air photography, photography can be accomplished with satisfactorily focusing both in water and in air. It is another advantage of the embodiment that focusing for the closest distance can be readily accomplished on dry land by just pushing the flexible membrane 203 with a finger, rendering the two contact pieces 202a and 202b conductive thereby.

While an automatic focusing mechanism is employed as means for focusing the photo-taking lens 7 in each of the embodiments in the foregoing, this invention is not limited to the use of such. The invention is likewise applicable to a camera which manually adjusts the focal point of the photo-taking lens 7. In that instance, focusing is manually performed for normal photography while, for underwater photography, the focusing position of the photo-taking lens 7 is restricted to a predetermined position suited for underwater photography. Such arrangement permits sharp focus photography either under water or on dry land, so that the operability of the camera for underwater photography can also be enhanced in the same manner as in the embodiments described in the foregoing.

The underwater waterproof camera, according to the invention, is provided with focusing means for adjusting the focus position of the photo-taking lens 7 and operation means for restricting the focus position of the photo-taking lens 7 to a position suited for underwater photography. While the focusing means permits accurate focusing for ordinary photography on land, the operation means restricts the photo-taking lens 7 to a focus position suited for underwater photography in the event of underwater photography, so that the operability and performance of the camera can be improved. The invented arrangement is highly advantageous for an underwater photography camera.

What I claim:
1. In a camera capable of underwater photography, the improvement comprising:
    (a) automatic focusing adjustment means for automatically performing the focusing adjustment of a photographic lens; and
    (b) restricting means for restricting focusing positions to which said photographic lens is to be set so that focusing is not effected to farther distances than a prescribed value when in underwater photography, whereby said restricting means allows for said automatic focusing adjustment means to operate when the measured value of the object distance is shorter than said prescribed one.
2. A camera according to claim 1, wherein said restricting means includes switching means arranged upon attachment of an accessory for underwater photography to said camera to render operative said restricting means.
3. A camera according to claim 2, wherein said restricting means is arranged to operate in association with an accessory mounted on the camera for underwater photography.

4. A camera according to claim 1, wherein said restricting means includes detecting means responsive to the fact that said camera lies under water for rendering operative said restricting means.

5. A camera according to claim 4, wherein said detecting means includes switching means arranged to be rendered conductive by the medium of water.

6. A camera according to claim 4, wherein said detecting means includes pressure sensitive means arranged to be rendered conductive by water pressure.

7. A camera according to claim 1, wherein said restricting means includes electromagnetic means.

8. A camera according to claim 1, wherein said photographic lens is arranged to be set by said restricting means at a focusing position for photographic objects located at distances from 0.7 to 4 m or thereabout.

* * * * *